Dec. 10, 1940.   M. A. POWERS   2,224,274
FABRIC MATERIAL
Filed Aug. 26, 1938   2 Sheets-Sheet 1

INVENTOR
Milton A. Powers

Dec. 10, 1940.   M. A. POWERS   2,224,274
FABRIC MATERIAL
Filed Aug. 26, 1938   2 Sheets-Sheet 2
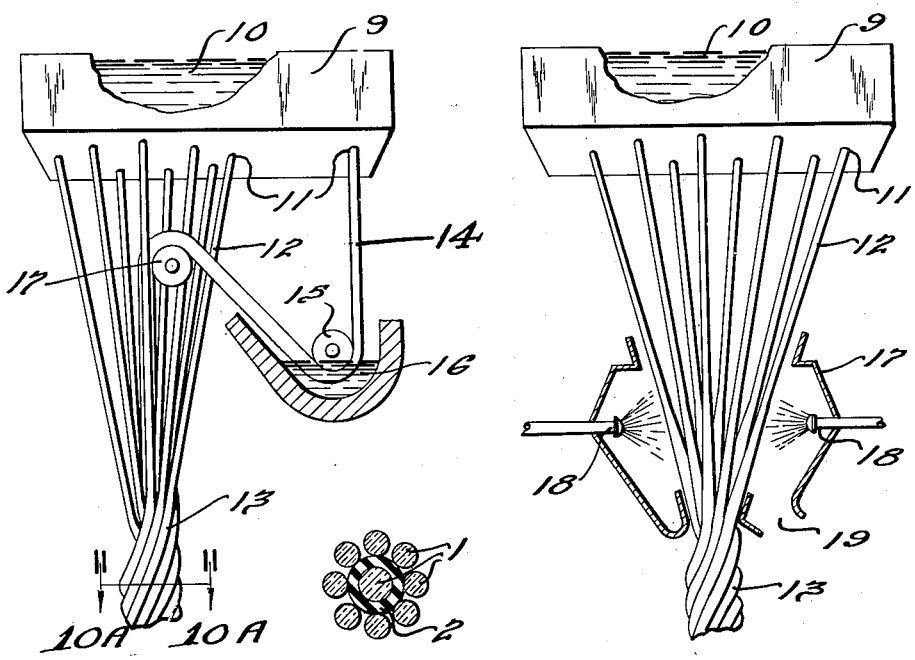
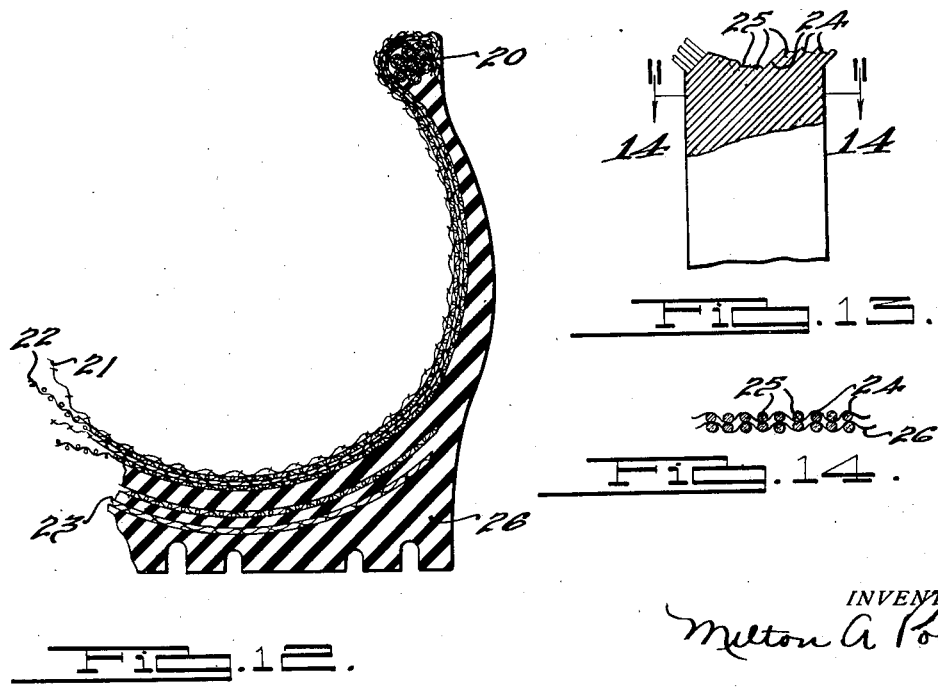
INVENTOR
Milton A. Powers Patented Dec. 10, 1940

2,224,274

UNITED STATES PATENT OFFICE 2,224,274

FABRIC MATERIAL

Milton A. Powers, Detroit, Mich.

Application August 26, 1938, Serial No. 226,985

5 Claims. (Cl. 57—153)

My invention relates to an improved fabric and cord material particularly adapted for use in the manufacture of automobile tires, but likewise valuable for power belts and similar load bearing fabric products.

An important object of the invention is to provide a base material having improved characteristics and desirable advantages in comparison with cotton, as now commonly used for such purposes.

More specifically, my object is to make practical use of finely drawn glass thread assembled and fabricated in a generally comparable manner to cotton as now applied to tire construction. However, I have found by careful examination and tests that full advantage cannot be had of the desirable properties of drawn glass thread for such purpose unless special attention is given to its inherent characteristics and provision made to overcome some of its natural deficiencies under the severe service conditions to which tires are subjected and under which they must perform without possibility of failure if they are to be considered commercially successful.

The invention may be more fully understood from the following description in conjunction with the accompanying drawings in which:

Figure 10 is a part view of a glass fiber drawing system whereby a portion of the fibers are rubber sheathed before twisting;

Fig. 10A represents a cross-section taken upon the plane of line 10A—10A in Fig. 10.

Figure 11 is a schematic view of a glass fiber drawing system whereby all of the fibers are passed through an atmosphere containing atomized latex so they are impregnated before twisting;

Figure 12 is a part section of a tire showing the incorporation of my invention;

Figure 13 is a section view of cord fabric incorporating alternate cords of fiber glass and cotton or rayon; and Fig. 14 is a section on the line 14—14 of Fig. 13.

Figure 1:
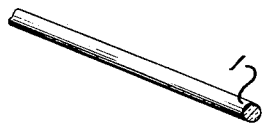
Figure 1 is a perspective sectional view of a single glass fiber greatly magnified.

Recent developments in the drawing and assembling into stranded thread form of fine glass fibers need not be discussed here in great detail beyond what is necessary to understand the problems to be overcome in practical use of this basic material in tire construction. However, it is important to understand that advances in the art whereby continuous fibers of consistently small and relatively unvarying diameters less than ½ of a thousandth of an inch became available, has so improved the qualities of the material itself that it has many of the desirable advantages of long staple cotton. Furthermore, the fact that the fibers are continuous, in the preferred form, although so-called staple material may also be used—aids in obtaining maximum strength with a minimum of material and section area.

One very important advantage of glass fiber is its greatly increased strength over cotton. It may be said conservatively that glass will provide several times the tensile strength of a comparable cross section area of long staple cotton. It is true that full data is not yet available on the ageing characteristics of glass fiber. Even assuming that the new fiber strength of the glass will decrease somewhat with age and use, there still remains a marked increase in strength over cotton. This means the same or increased tire strength with less bulk in the carcass, which in turn means greater flexibility, less internal friction and better heat dissipation.

A second factor of much importance is the ability of glass fiber to withstand any temperature to which a tire may be subjected without loss of strength. In fact, with glass cord there may be a slight increase in strength as the temperature rises. Furthermore, there is no increase in deterioration, as far as is known under maximum tire temperatures—which cannot be said to be true in the case of the conventional construction.

One of the most undesirable characteristics of glass fiber is brittleness, or tendency to break if subject to concentrated shock or bending strain at some point in its length. In this respect it acts in the same general manner as glass in its solid vitreous form. When solid glass is subjected to increasing strain there is no noticeable plastic flow of material before failure occurs. Upon refitting the parts of a broken test piece together there is no sign of change from the original size and shape.

A glass rod subject to bending strain breaks with a characteristic square ended fracture. As the diameter of the rod decreases the same fracture type continues. This characteristic persists regardless of diameter down to and including glass fibers of the size used in the present application. Under such circumstances it is reasonable to suppose that failure occurs under tension with evidence of extremely rapid propagation of the fracture at right angles to the stress.

However, as is commonly known increased flexing is possible as the diameter is decreased. For example, my tests have shown that glass rod of a diameter of $\frac{1}{32}''$ may be bent to the arc of a 10'' diameter circle before failure. The same glass in about $\frac{1}{64}''$ will reach a 6'' diameter before failure. Continuing, a .010 inch fiber may reach a 3'' circle, while a .001 inch fiber may continue without failure to a $\frac{1}{4}''$ circle.

In the case of smaller diameter fibers I have continued the above type of test by tying the thread into a simple knot and checking the results with the aid of a microscope. While to the unaided eye the thread seemed to be tied into a solid knot, the microscope showed the loop maintaining its maximum diameter up to the point of sudden fracture, with the ends then showing the typical square fracture.

It is evident from the above that any service condition which will deform the fiber to the arc of the minimum diameter circle will result in immediate and complete failure of the fiber. This condition need occur but once in the life of the tire to cause such failure and repeated stress would cause progressive failure of adjoining fibers and rapid loss of strength of the entire tire. Furthermore, the inability of the glass fiber to stretch without breaking necessitates that consideration be given to introducing a resiliency into the construction which will compensate for its lack in the base material.

Here, therefore, are conditions which must be protected against to make glass fiber completely successful for tire use. This I accomplish in the following manner:

The conventional glass thread is made up of a considerable number of individual glass fibers loosely twisted together. These fibers are in longitudinal contact. When withstanding the inflation pressure of the tire, these individual fibers are also under tension and lie tightly pressed one against the other—which is their normal state in use. When a concentrated deforming shock is received at any point, there is immediately a rise in tensile strain on the affected fibers. At the same time there is a combination crushing and bending action at right angles to the length of the fiber—its most vulnerable weakness. The combined strain and bending action may cause immediate failure of the fiber if the cross strain is concentrated in a very short length of the fiber. Failure of a single fiber allows an opening between the broken ends which causes abnormal strain upon the adjoining fibers and accelerates their failure. Furthermore, my tests show that repeated bending action of glass threads under tension causes a frictional movement between adjoining fibers which as nearly as I can determine decreases strength and life of the thread.

In order to accomplish the triple purpose of preventing friction between the adjacent glass filaments to balance the tension on adjoining fibers and to act as a shock absorbing medium to prevent too concentrated strain across the individual glass fiber, a protective sheathing or buffer is necessary. The desired characteristics of such sheathing are that it be rough and resilient, yet be quickly and easily applied. Furthermore, it must serve effectively in separating the individual glass fibers so that relative movement of one fiber upon another during use will result in little or no deterioration. Also, it must serve as a "strait jacket" for the individual filament or fiber and at the same time give some of the same support to adjoining filaments. By this I mean that the sheath must serve to absorb a shock which might otherwise break the brittle filament. In so doing it must also redirect the energy lengthwise so the filament can assimilate the shock over an appreciable distance. At the same time the stiffening support of the sheath results in a wider distribution of strain when the member is subjected to sharp flexing action.

In applying a protective sheath for the purpose described I have had best success in the use of a latex rubber coating. "Lotol" No. NS267 which is a self-curing latex of quite liquid consistency supplied by the Naugatuck Chemical Company, has been used with success in the coating of individual filaments. Continuous passage of the filament beneath the surface of the latex bath serves to coat it completely. By control of the amount of water and solvent in the latex and the speed and direction of the filament movement from the bath, the thickness of the sheath may be varied. Examination of the treated filament under a microscope shows an even coating with a smooth surface surrounding the glass fiber. Too much latex, or a dirty fiber condition, results in a "beady" coating due to the contracting effect of surface tension upon the liquid accumulation on the fiber. While the thickness of the sheath may be varied to suit circumstances, I have obtained and considered preferable a coating which increases the apparent diameter of the filament approximately 30 percent.

In this connection I have experimented with commercially available filaments of unknown age, and also with filaments made in my laboratory by the "spinning wheel" method. I have noted a tendency for the newly formed filament to take an even coating more readily than old fibers. I am unable to fully explain this apparent difference, although it may be due to relative freedom from adsorbed gases and surface accumulations on the newly drawn fiber.

Figure 2:
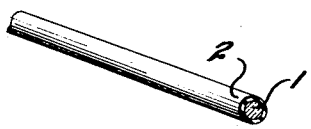
Figure 2 is a similar view of a single glass fiber rubber sheathed.

Figure 1 shows a portion of a single glass fiber or filament greatly magnified. When sheathed in rubber it takes on the appearance of Figure 2 where 2 is the rubber coating.

Figure 3:
Figure 3 shows an uncoated fiber fracturing under transverse shock.

Figure 3 shows a fiber 1 being deformed to the arc of a circle by the transverse action of an object 3 against it. Breakage occurs at the point of maximum stress 4.

Figure 4:
Figure 4 shows a sheathed fiber under similar conditions to those of Figure 3.

Figure 4 illustrates the protection given the fiber 1 by its rubber sheath 2 when deformed by the same force 3. In this case, in addition to the increased stiffness of the fiber which reduces the sharpness of the arc, there is a diffusing action on the rubber which causes the strain to be absorbed over a longer length of the filament.

Figure 5:
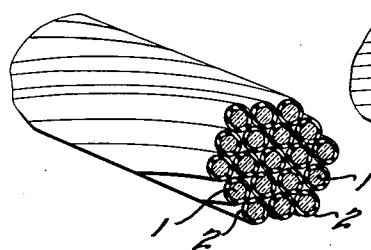
Figure 5 is a perspective sectional view of a thread made of a number of sheathed fibers twisted together.

A thread made from a number of individual filaments each sheathed as described and as illustrated in Figure 5, will probably make for maximum protection against failure of the fiber and longest life of the assembly. However, it will be at once evident that the presence of all this rubber will reduce the number of threads in a given section area and decrease strength correspondingly. With all fibers coated there actually exists two layers of rubber between adjoining glass filaments. This being both unnecessary and undesirable I have arranged for a portion of the fibers to be uncoated and so intermix them with the others as to provide a reasonably complete rubber barrier between adjoining fibers. This rubber supplies a buffing action between fibers and also provides stiffening action to give shock resistance against breakage. Just what percentage of sheathed fibers is best must depend upon experience in any given application.

Figure 6:
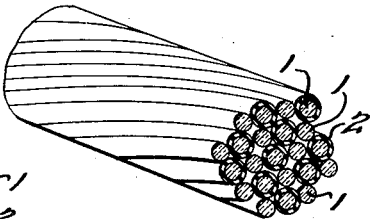
Figure 6 is a similar view of a thread made from both sheathed and bare glass fibers.

Figure 6 shows a portion of a thread made from both coated and uncoated filaments, so positioned as to produce the maximum protection to each filament. 2 is the rubber sheathing surrounding some of the filaments 1 and serving to prevent contact between adjoining filaments.

In attempting to rubber sheath a finished thread made up of a multiplicity of individual filaments twisted together, I have had less success. A rubber casing surrounding the entire thread is readily obtained but the penetration is usually imperfect. Furthermore, the filaments are in contact over much of their length and they remain so during and after impregnation as at 7, Figure 7 thus reducing the protection supplied by the rubber.

Figure 8:
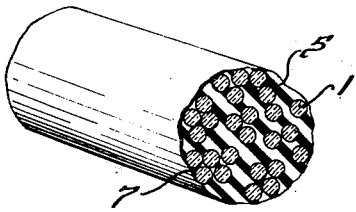
Figure 8 is a similar view of a thread thoroughly impregnated after twisting.
Figure 7:
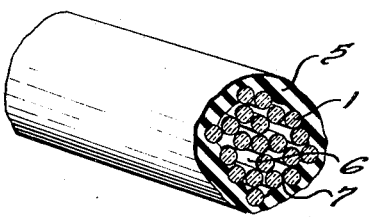
Figure 7 is a view of a thread partly impregnated after twisting.

As shown in Figure 7, a rubber outer covering 5 over the fibers 1 is reduced. However, untreated areas and spaces 6 are present while groups of uncoated fibers remain. Furthermore, when more complete penetration is obtained, as shown in Figure 8, there results in too much rubber being present at points where it is not needed, yet the same undesirable conditions of bare fiber contact remains. Consequently, while I would not care to be limited in the scope of this part of my invention to individually coated filaments, I prefer that method of impregnation.

Various methods in processing are possible to obtain the best results in my preferred method, and some will be described, although others undoubtedly will occur to those familiar with the related arts. The glass thread is customarily made by twisting together a large number of continuous filaments, in one instance approximately 100 constituting a thread. In such a case a percentage of the filaments making up the threads will be continuously coated and dried sufficiently to prevent deformation before assembly into the thread. By accurate control of drying rate it is possible to assemble the thread either with the rubber sheath sufficiently adherent to fix the position of all the filaments, or completely cured and dry.

Figure 10 illustrates a section of a glass fiber drawing operation in which 9 is the tank containing melted glass as shown in cutaway section at 10. 11 indicates a plurality of drawing orifices through each of which a single filament is drawn continuously. The number of such orifices is large, but I have shown only one section to illustrate the operation. The resulting filaments 12 pass downward continuously converging to 13 when they are twisted together as a portion of a thread. Filament 14 is independently handled and passes over pulley wheel 15 at which point it is coated by submergence in latex bath 16. It then dries as it passes upward over pulley wheel 17 and then downward into the center of the thread. View Figure 10A shows in section the resulting thread portion. Other thread portions are simultaneously produced and twisted together to form the resultant construction shown in Figure 6. In view of the extremely small size and fragility of the individual filament it may be desirable to practically make the sheathed core of a small number of fibers; for example, three instead of a single fiber to prevent breakage in fabrication.

Another method is to pass all or a portion of the filaments as they are drawn from the liquid glass through a spray chamber containing an atmosphere of atomized latex with which the filaments are coated before twisting. In Figure 11, 12 are the filaments converging to form the thread section 13. 17 is an enclosure into which spray heads 18 project. An atmosphere of atomized latex fills the chamber and coats the filaments in passage. 19 is an air duct for withdrawing air and maintaining controlled air conditions inside the enclosure, with the assistance of a fan (not shown). While I have spoken particularly of the use of latex in one form or another it is probable that similar results may be obtained by the use of rubber dissolved by other solvents and with other curing agents. Furthermore, similar desirable qualities may be obtained by the use of coating materials other than rubber; for example, vinyl acetate, pyroxylin, methacrylate or resin base solutions, many forms of which are now available and lend themselves readily to easy application.

Figure 9:
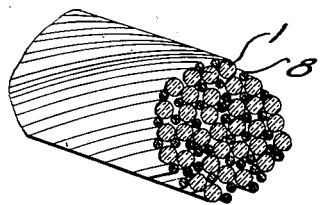
Figure 9 is a perspective sectional view of a thread made of glass fiber intermixed with cotton or rayon.

As the prime purpose of my invention is the use of glass fibers as an improvement over cotton in the manufacture of tires, I wish to disclose other means of making their adoption practical. To this end it is possible to provide a degree of protection to the glass filaments by intermixing with them a percentage of cotton fiber. The same general result may be obtained by using a proportion of continuous rayon filaments. Both cotton and rayon are elastic under shock without permanent deformation, and serve as a buffer between the hard and incompressible glass filaments. Thread so made is illustrated in Figure 9 where 1 indicates the glass filaments and 8 the cotton or rayon. The percentage ratio of each mixture may be varied considerably to produce the best total result. The fact must be recognized that drawn glass as an improvement over the conventional cord is so radical a change, both as a technical improvement and in its possible reaction from the buying public, that the public in particular may or may not quickly accept the change, regardless of its merit. Having these facts in mind it is very possible that combinations of glass and cotton or rayon may be most advantageous during the acceptance period. Recognizing this, I do not wish to be limited in the scope of my invention to particular combinations, but have included and described some combinations as descriptive of the possibilities of my invention.

For example, in some cases advantages such as increased strength may be obtained by partially fabricating a tire with cotton cord or fabric, and providing one or more layers of glass fiber cord or fabric. In another case the tire section may be entirely constructed with glass fibers except for one or more layers of breaker strip 23 where the shock load is most severe. It is likewise probable that reinforcement to give added strength in the bead would be obtained by using a bead material incorporating glass fibers as shown at 20 of Figure 12, which is a partial section view of a tire. Figure 12 likewise shows a tire construction in which layers of glass cord 21 alternate with layers of cotton or rayon cord 22. As an alternate construction, Figure 13 which is a partial section view of a layer of cord material, shows alternate cords of glass 24 and cotton or rayon cord 25, all held intact in the customary manner by means of binding threads 26 of Figure 14.

As many changes can be made in the above described invention and many apparently different embodiments can be made without departing from the scope thereof, it is intended that all matter contained in the above descriptions or shown in the accompanying drawings shall be interpreted as illustrative and not in a limiting sense.

Having thus described my invention, what I claim as new and desire to secure by Letters Patent is—

1. The process of making thread from glass which consists of drawing a plurality of glass fibers, coating at least one and considerably less than the total number of the fibers with a resilient material, and assembling the fibers to form a thread in such manner as to minimize glass to glass contact in the finished thread.

2. The process of making a thread from a plurality of elongated glass fibers, consisting in coating only sufficient surface area of the fibers with a relatively soft material that when the threads are assembled in a preselected manner there will be no more than a single thickness of the coating material at any point between any two adjacent fibers, the coating having a maximum thickness much less than the fiber diameter, and thereafter assembling said fibers in said preselected manner to form a thread.

3. The process of making a thread from a plurality of elongated glass fibers, consisting in coating at least some of said fibers with a relatively soft material to increase the diameters thereof by approximately 30 per cent, and combining said fibers to form a thread in which the adjacent fibers of each pair are separated by no more than a single thickness of the coating material.

4. The process of making a thread from a plurality of elongated glass fibers, comprising the steps of covering one only of said fibers with a resilient material and disposing the others compactly around it so that it becomes an axial core of the completed thread and so that there is substantially no glass to glass contact between any of the uncovered fibers.

5. A thread of the character described, comprising a plurality of elongated glass fibers of which one or a larger number less than the total have individual coatings of relatively soft material, said fibers being so arranged that there is substantialy no contact of the uncoated fibers with each other and so that there is no more than a single coating thickness between any two adjacent fibers.

MILTON A. POWERS.